United States Patent
Brookner

(10) Patent No.: US 7,038,615 B2
(45) Date of Patent: May 2, 2006

(54) EFFICIENT TECHNIQUE FOR ESTIMATING ELEVATION ANGLE WHEN USING A BROAD BEAM FOR SEARCH IN A RADAR

(75) Inventor: Eli Brookner, Lexington, MA (US)

(73) Assignee: Raytheon Company, Waltham, MA (US)

( * ) Notice: Subject to any disclaimer, the term of this patent is extended or adjusted under 35 U.S.C. 154(b) by 144 days.

(21) Appl. No.: 10/683,507

(22) Filed: Oct. 10, 2003

(65) Prior Publication Data

US 2005/0253748 A1 Nov. 17, 2005

(51) Int. Cl.
G01S 13/72 (2006.01)

(52) U.S. Cl. ............... 342/74; 342/75; 342/79; 342/80; 342/96; 342/107; 342/113; 342/123; 342/140; 342/149; 342/154; 342/157; 342/158; 342/188; 342/196

(58) Field of Classification Search ........... 342/74, 342/75, 79–81, 89, 90, 95–99, 107, 113, 115, 342/123, 133, 135, 139–141, 146, 147, 149, 342/152–158, 188, 192, 196
See application file for complete search history.

(56) References Cited

U.S. PATENT DOCUMENTS

| | | | | |
|---|---|---|---|---|
| 3,828,349 | A | * | 8/1974 | Laurenceau ............... 342/123 |
| 4,101,902 | A | * | 7/1978 | Trigon ..................... 342/374 |
| 4,163,974 | A | | 8/1979 | Profera |
| 4,347,513 | A | | 8/1982 | Schindler |
| 4,649,389 | A | * | 3/1987 | Taylor et al. ............. 342/123 |
| 4,649,390 | A | | 3/1987 | Andrews et al. |
| 4,720,711 | A | * | 1/1988 | Quesinberry et al. ....... 342/96 |
| 4,720,712 | A | | 1/1988 | Brookner et al. |
| 4,743,907 | A | | 5/1988 | Gellekink |
| 4,766,437 | A | * | 8/1988 | Schmidt et al. ........... 342/368 |
| 4,914,441 | A | | 4/1990 | Brookner |
| 5,014,061 | A | | 5/1991 | Ghose |
| 5,173,706 | A | * | 12/1992 | Urkowitz .................. 342/99 |
| 5,302,955 | A | | 4/1994 | Schutte et al. |
| 5,442,359 | A | | 8/1995 | Rubin |
| 5,448,243 | A | | 9/1995 | Bethke et al. |
| 5,557,282 | A | * | 9/1996 | Mertens .................... 342/123 |
| 5,592,178 | A | | 1/1997 | Chang et al. |
| 5,771,014 | A | | 6/1998 | Shinonaga |

(Continued)

FOREIGN PATENT DOCUMENTS

DE 44 07 369 A1 9/1995

(Continued)

OTHER PUBLICATIONS

"Siimulating Data Generated by a Network of Track-While-Scan Radars", Barros, F.J.; Engineering of Computer-Based Systems, 2005. ECBS '05. 12th IEEE International Conference and Workshops on the Apr. 04-07, 2005 Page(s):373-377.*

(Continued)

Primary Examiner—John B. Sotomayor
(74) Attorney, Agent, or Firm—Daly, Crowley, Mofford & Durkee, LLP

(57) ABSTRACT

A method and apparatus for estimating elevation angle when using a broad search beam such as a cosecant-squared beam is provided. The range of a target detected during a search with a broad beam covering a broad angular search area is determined. Based on the determined range, consecutive beams are transmitted at increasing search elevation angles in the broad angular search area. Echo signals of the consecutive beams are used to determine an elevation angle estimate for the target.

57 Claims, 7 Drawing Sheets

U.S. PATENT DOCUMENTS

| | | | |
|---|---|---|---|
| 5,917,442 | A | 6/1999 | Manoogian |
| 6,078,289 | A | 6/2000 | Manoogian et al. |
| 6,104,343 | A | 8/2000 | Brookner et al. |
| 6,122,040 | A | 9/2000 | Arita et al. |
| 6,169,518 | B1 * | 1/2001 | Nelson et al. ............ 342/373 |
| 6,218,979 | B1 | 4/2001 | Barnes et al. |
| 6,232,920 | B1 | 5/2001 | Brookner et al. |
| 6,362,774 | B1 | 3/2002 | Green |
| 6,538,597 | B1 | 3/2003 | Steudel |
| 6,630,902 | B1 | 10/2003 | Fenton et al. |
| 6,677,887 | B1 | 1/2004 | Harman |
| 6,888,493 | B1 * | 5/2005 | Driessen et al. ............ 342/91 |
| 2002/0060639 | A1 | 5/2002 | Harman |
| 2003/0078730 | A1 | 4/2003 | Seklguchi |
| 2003/0088361 | A1 | 5/2003 | Seklguchi |
| 2003/0097237 | A1 | 5/2003 | Seklguchi |
| 2004/0054473 | A1 | 3/2004 | Shimomura |
| 2004/0080449 | A1 | 4/2004 | Horibe |
| 2005/0030222 | A1 | 2/2005 | Steudel |

FOREIGN PATENT DOCUMENTS

| | | |
|---|---|---|
| EP | 0 509 843 A2 | 10/1992 |
| EP | 0 509 843 A3 | 10/1992 |
| EP | 0 851 238 A2 | 7/1998 |
| EP | 0 851 238 A3 | 7/1998 |

OTHER PUBLICATIONS

PCT Search Report for PCT/US2004/032065 dated Apr. 29, 2005, and Including Written Opinion of the ISA (Alty. Dckt. No. RTN-177PUS).

Copy of PCT/US2004/032065 Search Report.

Baker et al.: "Netted Radar Sensing;" Aerospace and Electronic Systems Magazine, IEEE, vol. 18, Issue 2; Feb. 3-6, 2003; pp. 3-6.

Shedyshev et al.: "Focusing of the Spatially Separated Adaptive Antenna Arrays on Multiple Radiation Sources by Method of Correlation Identification of the Bearings;" Ant. Theory and Techs; 2003; IV International Conference; vol. 1; Sep. 9-12, 2003; pp. 42-46.

Brookner; "Multiple Radar Combining for Increased Range, Radar Sensitivity and and Angle Accuracy;" U.S. Appl. No. 10/684,081; filed on Oct. 10, 2003; (Atty. Dckt. No. RTN-176PUS).

Steudel; "An Improved Process for Phase-Derived Range Measurements;" U.S. Appl. No. 10/627,436; filed on Jul. 25, 2003 (Atty. Dckt. No. RTN-175PUS).

PCT Search Report; PCT/US2004/019056, dated Oct. 12, 2004 (Atty. Dckt. No. RTN-175PUS).

PCT Search Report; PCT/US2004/032247, dated Feb. 22, 2005 (Atty. Dckt. No. RTN-176PUS).

* cited by examiner

EFFICIENT TECHNIQUE FOR ESTIMATING ELEVATION ANGLE WHEN USING A BROAD BEAM FOR SEARCH IN A RADAR

BACKGROUND

The invention relates generally to radar systems.

In ground-based search radar systems with rotating (360°) antennas, a broad fan beam or shaped beam, e.g., a cosecant-squared beam, can be used to efficiently search over large elevation angles. This type of approach to searching for a target over a large angular search area is less time consuming than a single sequential beam approach. Typically, an elevation monopulse channel and an azimuth monopulse channel provide an accurate estimate of elevation angle and azimuth angle, respectively, for a target detected by narrow pencil beams. Unfortunately, accurate elevation estimates cannot be obtained for a target detected by the broad beam. One solution to this problem is to use a stacked beam on receive. The use of a stacked beam is costly, however, as it requires one or two receivers for each beam in the stacked beam.

SUMMARY

The present invention is therefore directed towards a mechanism for efficiently determining elevation angle information of a target detected in elevation with a broad beam such as a cosecant-squared beam.

In one aspect, therefore, the present invention provides methods and apparatus for determining target elevation during a radar search. The methods include determining the range of any target detected during a search with a broad beam covering a broad angular search area and, based on the determined range, transmitting consecutive beams at increasing search elevation angles in the broad angular search area and using echo signals of the consecutive beams to obtain an elevation angle estimate for the target.

Embodiments of the invention may include one or more of the following features.

The broad beam can be a shaped cosecant-squared beam.

The consecutive beams can be transmitted sequentially in time.

The first of the consecutive beams (the one at the lowest elevation angle) can be focused. Alternatively, it can be slightly defocused. The succeeding beams at successively higher elevation angles can be defocused by spoiling factors that increase with the increasing search angles. Typically all but the first one of the consecutive beams is defocused.

For a pulse Doppler radar, the transmission of the consecutive beams can include transmitting a pulse Doppler waveform which includes a set of transmit bursts, each transmit burst including a number of sub-pulses. Consecutive groups of subpulses in each transmit burst correspond to the consecutive beams. Corresponding numbered sub-pulses in each of the transmit bursts of the set have the same carrier frequency. The sub-pulses in each transmit burst can have different carrier frequencies. It is, however, possible although not generally preferred, to have the same carrier frequencies for different groups (or bursts) of sub-pulses.

Using the echo signals includes processing echo signals of the first one of the consecutive beams to detect the target. If the target is detected, an elevation angle estimate for the target is determined. Using the echo signals further includes (i) processing, in turn, echo signals of the defocused consecutive beams in the sum and difference channels until the target is detected in one of the defocused consecutive beams; (ii) using the results of the processing of the echo signals of the one of the defocused consecutive beams in which the target is detected to provide a first estimate of the elevation angle of the target; (iii) transmitting a focused beam towards the target based on the first estimate; and (iv) processing echo signals of the focused beam in the sum and difference channels to detect the target and determine a second, more accurate estimate of the elevation angle of the target.

Particular implementations of the invention may provide one or more of the following advantages. The search mechanism is quite efficient in that it makes use of the knowledge of the range of the target and the radar system's elevation scan capability together with a time multiplexed waveform to obtain a more accurate determination of the target elevation. The time multiplexed waveform transmits pulses at different elevation angles to look for the target during one dwell time. These pulses use defocused beams. The defocusing is increased with the degree of the elevation angle being searched. Such defocusing is possible and desirable because the range to the detected target decreases with increasing elevation angle. The defocusing is needed in order to efficiently cover the elevation uncertainty angle which one has after detecting the target with the cosecant-squared beam or the fan beam. Once the target is located with the defocused beam, a focused beam is used to get the final, highly accurate elevation angle estimate. With an antenna having an azimuth look-back capability, it is possible to do the dwells with the defocused and focused beams during the same rotation period as that in which the target is detected. Thus, the approach of the present invention provides for efficient searching above a certain low elevation angle, e.g., six degrees (or even zero degrees), without adversely impacting search frame time as with the conventional single sequential beam approach.

Other features and advantages of the invention will be apparent from the following detailed description and from the claims.

DESCRIPTION OF DRAWINGS

Like reference numerals will be used to represent like elements.

DETAILED DESCRIPTION

Figure 1:
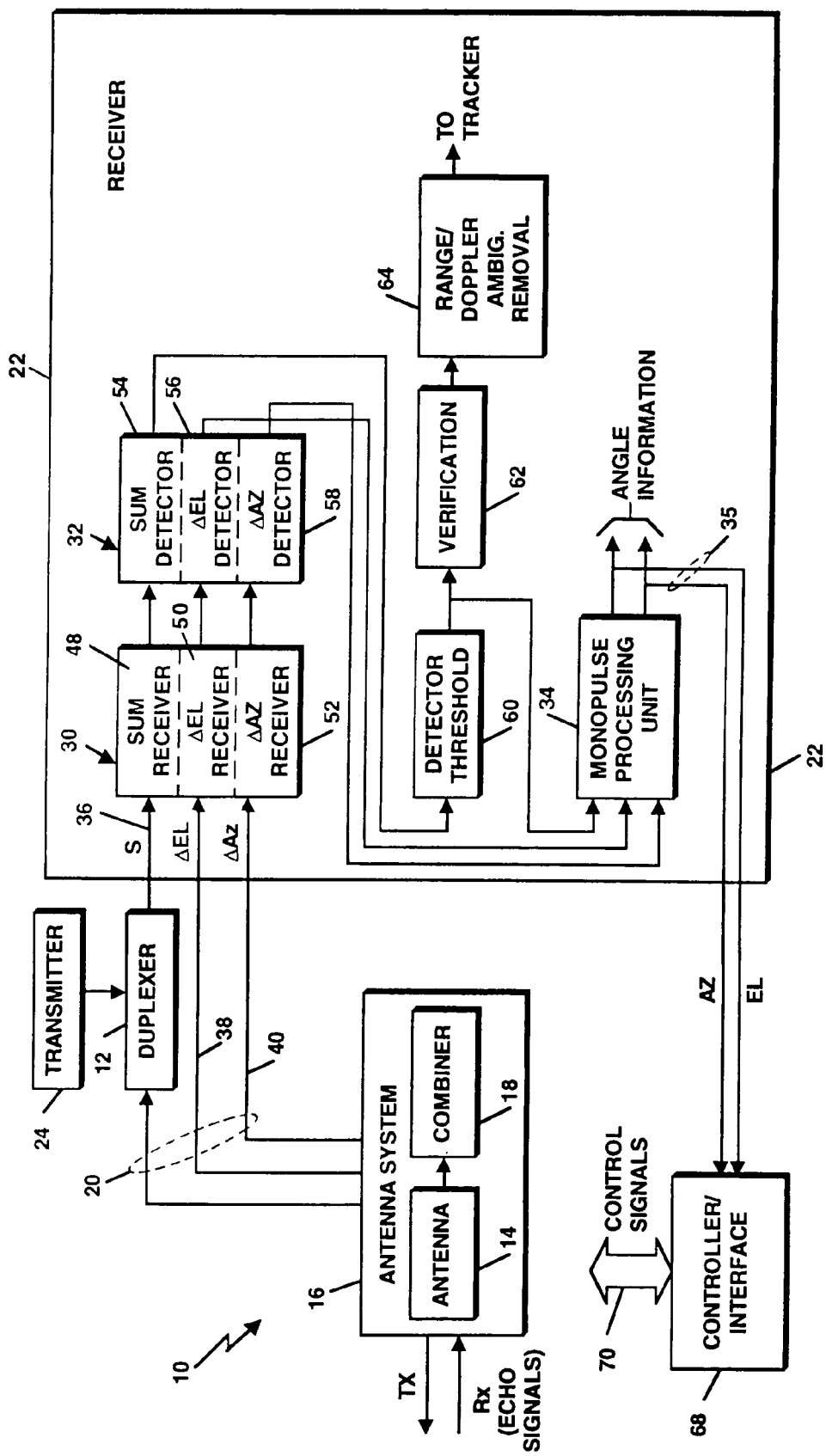
FIG. 1 is a block diagram of a pulse Doppler monopulse radar system.

Referring to FIG. 1, a radar system 10 is shown. The radar system 10 may be a ground-based radar system, but could be used on a ship, aircraft or spacecraft as well. The radar system 10 includes a transmitter 12, the output of which is delivered to an antenna 14 (in an antenna system 16) for radiation in the form of a transmit beam. The antenna 14 collects echo signals received from a target and a combiner 18 (also in the antenna system 16) combines the echo signals into receive signals 20, which are processed by a receiver 22 to detect the presence of the target and determine its location in range and in angle. In the illustrated embodiment, the antenna 14 is a mechanically rotating antenna to scan in azimuth. However, the antenna 14 could also be an electronically scanned in azimuth antenna. A duplexer 24 coupled to the transmitter 12, receiver 22 and antenna 14 allows the antenna 14 to be used on a time-shared basis for both transmitting and receiving.

Still referring to FIG. 1, the receiver 22 includes a receiver block 30 to perform RF-to-IF conversion, amplification, A/D conversion, possibly pulse compression filtering, as well as includes a detector block 32 and a monopulse processing block 34. The detector block 32 detects the presence of the target. More specifically, the detector block 32 performs Discrete Fourier Transforms (DFTs), envelope detection and post-detection integration (video integration), among other functions. The monopulse processing block 34 produces angle information 35 from the output of the detector block 32. The angle information includes information indicative of estimated elevation angle and azimuth angle.

In the illustrated embodiment, the receiver 22 is a monopulse receiver. Thus, receive signals 20 include three signals, a sum (S) signal 36, an elevation difference ("ΔEL") signal 38 and an azimuth difference ("ΔAZ") signal 40. The receiver block 30 and the detector block 32 can be partitioned into three separate channels, one for each of the signals 36, 38 and 40, respectively. Thus, receiver block 30 includes receiver blocks 48, 50 and 52, and detector block 32 includes detector blocks 54, 56 and 58. The receiver block 48 and detector block 54 form a sum channel to process the sum signal 36. The receiver block 50 and detector block 56 form an elevation difference channel to process the elevation difference signal 38. The receiver block 52 and the detector block 58 forms an azimuth difference channel to process the azimuth difference signal 40.

The sum channel is further coupled to a threshold detect unit 60, which generates a range signal from the output of the sum channel's detector block 54. The receiver 22 also includes a detection verification block 62 as well as a range and Doppler ambiguity removal block 64. Although not shown, the receiver 22 may be coupled to a tracker.

The output of the monopulse processing block 34 is connected to a controller/interface 68. The controller 68 provides control signals 70 to functional blocks of the system 10. In particular, the controller 68 enables the system 10 to perform a target search at higher elevation using a broad search beam, and to determine an accurate elevation angle estimation of a target detected by such a broad search beam, as will be described.

A "broad" elevation search beam, that is, a beam that covers a broad elevation angular search area, is a defocused (or spoiled) beam that is at least as wide as the combined beamwidths of two focused beams. Typically, however, it is much wider. A "focused" beam is a beam that has no phase modulation (for the illumination across the antenna) in the vertical direction, resulting in a beamwidth in elevation of approximately λ/H, where H is the height of the antenna. In contrast, a "defocused" beam is a beam that has phase modulation in the vertical direction. For example, a defocused beam could have a quadratic-like phase modulation.

Those aspects of the radar system 10 not described herein can be implemented according to known radar techniques, for example, those found in the "Aspects of Modern Radar," edited by Eli Brookner, (Artech House, Inc., 1988), incorporated herein by reference, and other sources. For example, monopulse techniques are discussed at some length in Chapter 5, pages 297–335, of the above-referenced Brookner text.

Figure 2:
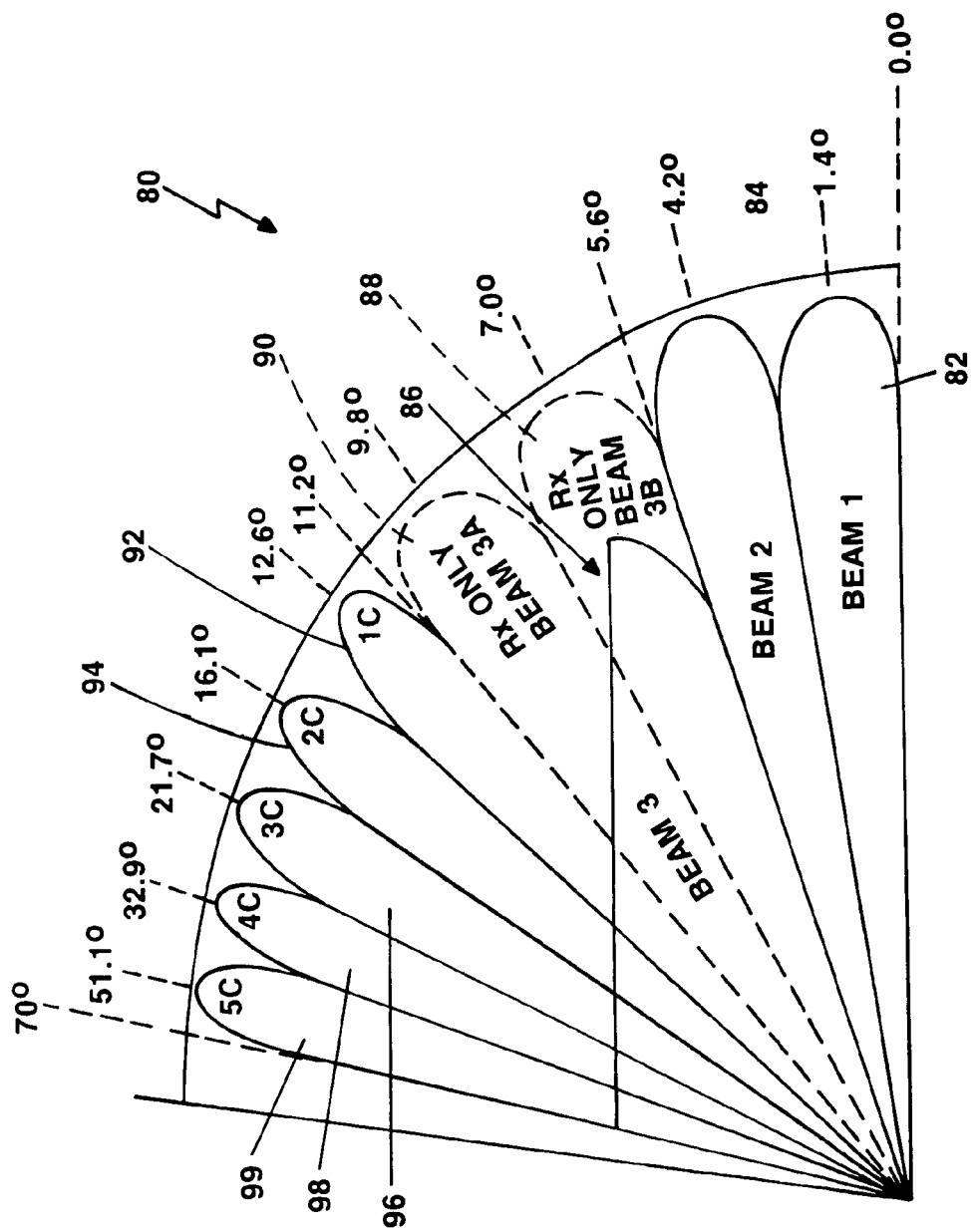
FIG. 2 is depiction of transmit and receive beams used by the monopulse radar system of FIG. 1 for search coverage from 0 to 70 degrees.

During a target search, the antenna 14 transmits one of two different types of beams depending on search elevation. Referring to FIG. 2, exemplary search coverage 80 includes on transmit two narrow beams 82 ("beam 1") and 84 ("beam 2") and a broad search beam 86 ("beam 3"). The narrow beams 82, 84 are used for searching at low elevation angle (e.g., from the horizon up to 5.6° in elevation, as shown) at long range. For an efficient higher elevation search, for example, when searching elevation angles from 5.6° up to 70°, the broad beam 86 is used. The broad beam 86 can be a beam such as a cosecant-squared ("$CSC^2$") shaped beam (as illustrated), which is a recognized beam pattern for searching large angular volume. The lower beams 82 and 84 use all three channels, in particular, the sum channel to detect the target and elevation and azimuth monopulse receive channels to provide estimates of the target azimuth ("AZ") and elevation ("EL") angles. The broad beam 86, e.g., the $CSC^2$ beam, does not use AZ or EL monopulse. Therefore, the broad beam 86 does not provide any EL angle estimates. Consequently, the beam 86 obtains good elevation coverage at the sacrifice of elevation angle measurement accuracy. Furthermore, it has the important advantage of providing the large angle coverage with only three receivers, thus lowering cost. Finally, the broad beam provides such large angular coverage in a short time, thus allowing a fast volume revisit time.

In one embodiment, when illuminating the search volume with the broad beam, the two channels ordinarily used on receive for the AZ and EL monopulse with beams 1 and 2 are also used for focused receive beams 88 and 90 ("beam 3A" and "beam 3B") to provide better long range coverage in a lower elevation search area of the broad beam 86, for example, in the illustrated embodiment, between the angles 5.6° and 11.2°. They also provide some elevation angle estimation, specifically, if the target is detected in either of these focused receive beams 88 and 90, an initial rough estimate of its elevation angle is available. The amplitude of the returns in the two receiver channels associated with these two beams give some indication of the target's location in elevation. That is, elevation amplitude monopulse estimates can be obtained from the outputs of beams 88 and 90. When such an estimate is available, the system 10 transmits a focused beam in the direction of the target's location. This focused transmit beam has monpulse AZ and EL, and provides an accurate estimate of the target's EL and AZ angles. A pulse Doppler waveform whose pulse repetition frequency ("PRF") has no range and Doppler eclipsing could be used for the focused transmit beam. If it is determined that the target is not detected by beams 3A or 3B (which provide coverage between angles 5.6° and 11.2°), the system 10 uses a special elevation angle estimation process involving additional transmit beams, including beam 92 (beam 1C), beam 94 (beam 2C), beam 96 (beam 3C), beam 98 (beam 4C) and beam 99 (beam 5C), at increasing search elevation angles, as will be described below with reference to FIGS. 3–7.

Figure 3:
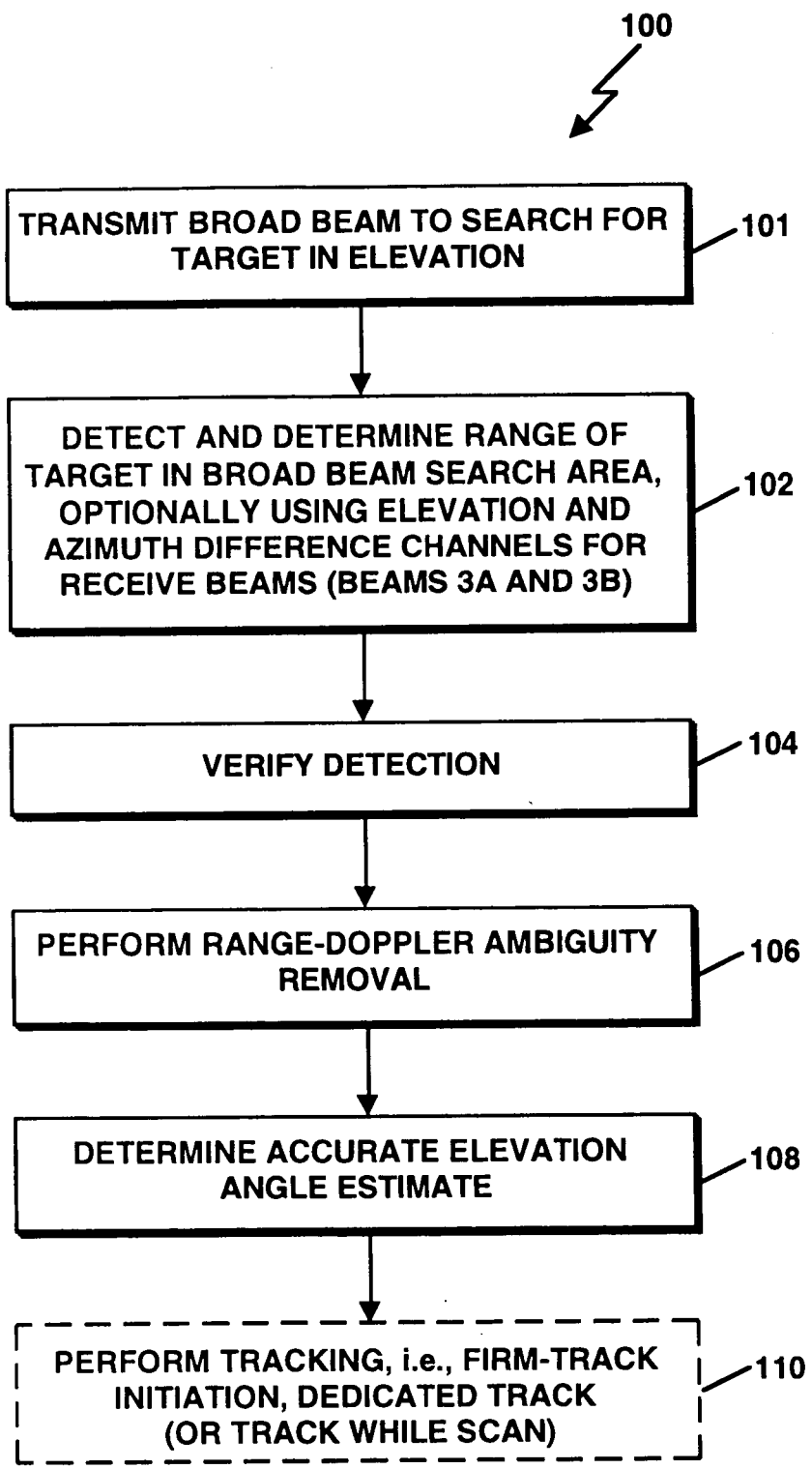
FIG. 3 is a flow diagram of the operational flow of a broad beam target search that uses an elevation angle determination process for determining elevation angles for targets detected in higher elevation.

Referring to FIG. 3, an overview of a broad beam search process 100 that uses an elevation angle determination process for determining elevation angles for targets detected at the higher elevation angles covered by beam 86 is shown. The process 100 is performed by system 10 under the control of the controller 68. To begin, the system 10 transmits a broad beam to search for the target in elevation (step 101).

In the illustrated embodiment, and as was indicated earlier, the broad beam 86 is a shaped beam, more specifically, a CSC² beam. In one embodiment a PRF pulse Doppler waveform having range and/or Doppler ambiguities is used. The system 10 detects and determines the range of a target in the broad angular elevation search area covered by the broad beam. Optionally, the system 10 uses the elevation and azimuth difference channels to form receive beams (beams 3A and 3B) to determine if the target is detected in one of those receive beams (step 102). During detection, the system uses a low false alarm probability (Pfa) setting like $10^{-6}$. Upon detection, the system 10 verifies that the detection is an actual echo from a real target rather than a false alarm (step 104). The verify is done using a larger Pfa of, say, $10^{-2}$. This is possible as there are fewer range-Doppler cells in which to look for the target during verification. If system 10 has an azimuth scan it can look back for the verification. Alternately, the verification can be performed on the next scan (rotation). Nominally the verification would be performed with a pulse Doppler waveform having the same carrier frequency and PRF as was used in the detection of the target to allow verification of the target with minimum radar energy.

If the detection verification confirms that a target is present, one or more additional pulse Doppler bursts having the same carrier frequency at different PRFs are used to remove the range-Doppler ambiguities (step 106). This removal can be done with further look backs or can occur on the next two scans. During this ambiguity removal stage, the Pfa is lowered below the value used for verify to a value like $10^{-4}$. It is necessary to lower the Pfa because there are more range and Doppler cells to look at during ambiguity removal. Once it is determined unambiguously where the target is in range, the system 10 employs an elevation angle determination process 108 to locate the target accurately in terms of the target's elevation angle. While not part of the search process (and thus indicated in dashed lines), the system 10 can then perform tracking, including a firm-track initiation as well as a dedicated track or track-while-scan, in accordance with known techniques. In the illustrated embodiment, the bandwidth for steps 102, 104 and 106 is perhaps 1 MHz, while the bandwidth for process 108 is 5 MHz.

Figure 4:
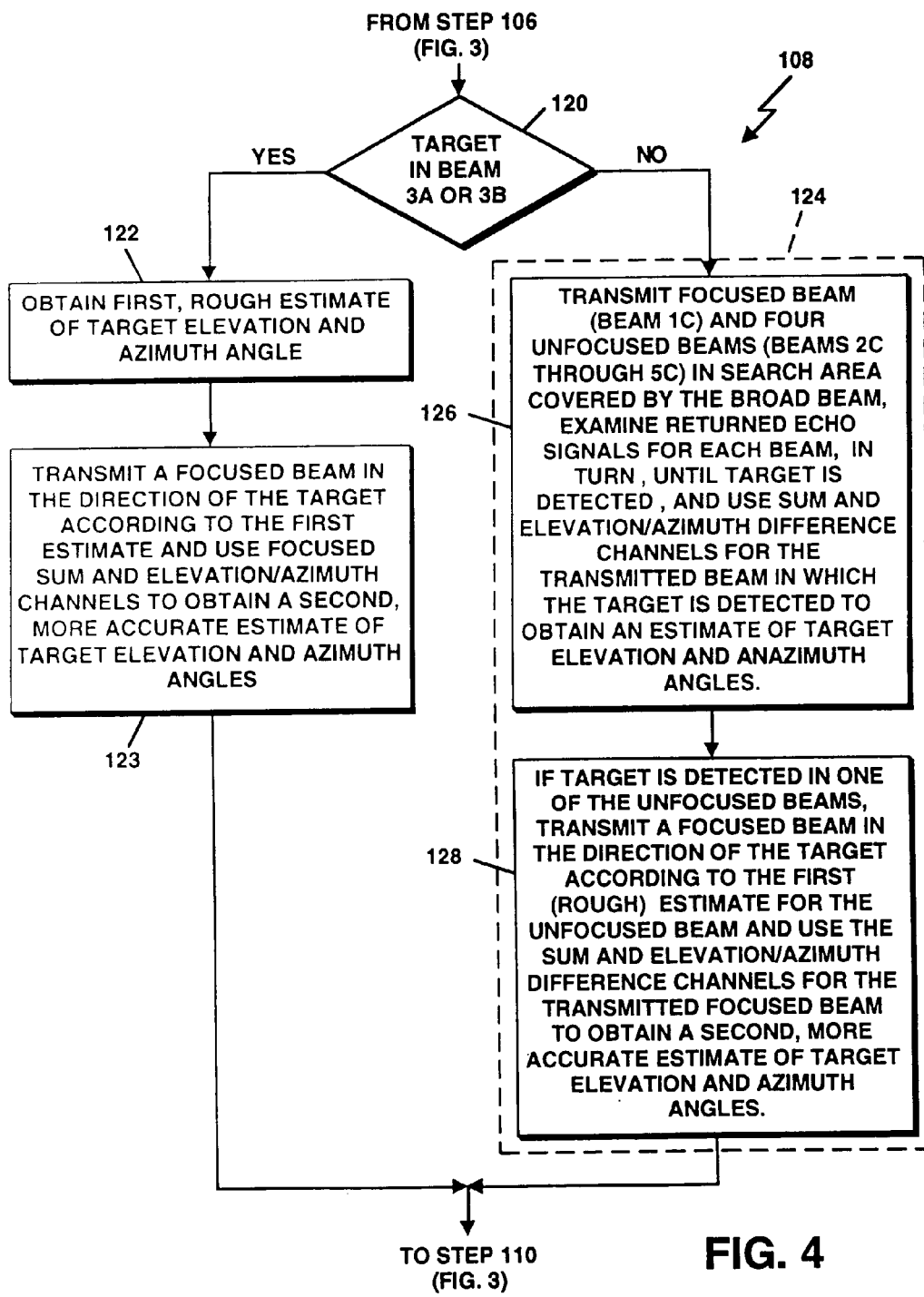
FIG. 4 is a flow diagram of the elevation angle determination process (of FIG. 3) for a single detected target.

Referring to FIG. 4, which depicts process 108 for a single target detection, if it is determined that the target is detected in one of the receive beams 3A and/or 3B on transmitting the CSC² beam (step 120), the system 10 provides a rough estimate of the target elevation angle (step 122). The system 10 then transmits a focused beam at this location and uses the sum, ΔEL and ΔAZ channels on receive to obtain an accurate estimate of the target elevation and azimuth angles (step 123). In some cases, when the target is detected in beams 3A and/or 3B, its elevation and azimuth angles can be determined accurately enough to allow focused beams to be used for verification and ambiguity removal.

If, at step 120, it is determined that the target is not detected in the receive beams 3A and 3B but is instead at a higher angle, the system 10 uses an elevation angle estimation process 124 to obtain the elevation angle estimate. In the elevation angle estimation process 124, the system 10 transmits sequentially in time the focused beam 1C (or alternatively, a defocused beam 1C) and defocused beams 2C through 5C, and, for each of these beams, uses the sum, ΔEL and ΔAZ channels to obtain an estimate of the target elevation and azimuth angles (step 126). If the target is detected in one of beams 2C through 5C, the system 10 points a focused beam in the direction in which the target is estimated to be, and uses the elevation and azimuth difference channels and sum channel to obtain a more accurate estimate of the target elevation and azimuth angles (step 128).

Figure 5:
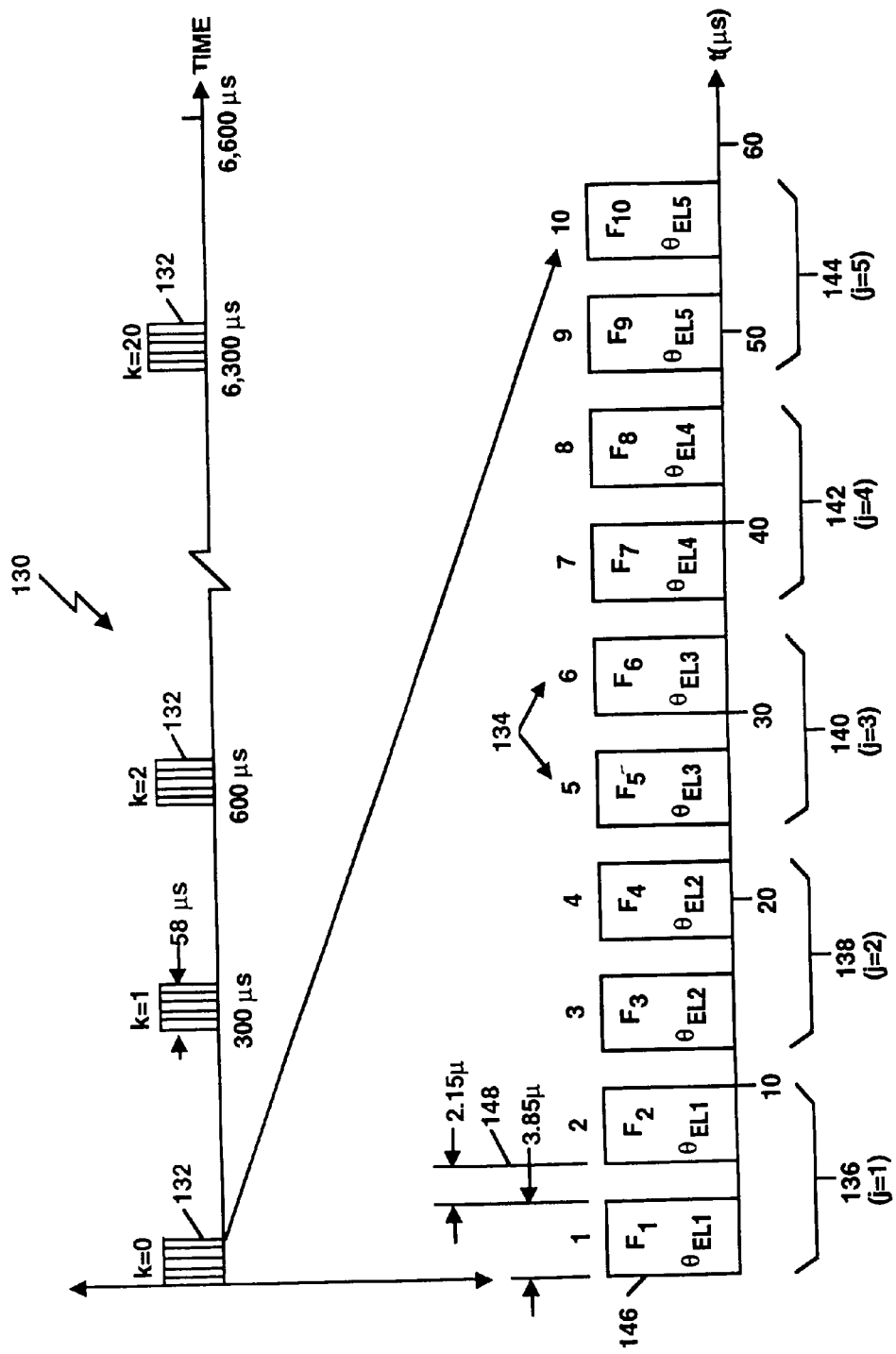
FIG. 5 is an illustration of the waveform used during the elevation angle determination process from FIG. 4.

Referring now to process 124 in conjunction with FIG. 5, because the target range information is known, it is possible to transmit a time-multiplexed pulse Doppler waveform which has no range or Doppler eclipsing. Such a waveform is shown in FIG. 5. Referring to FIG. 5, a pulse Doppler waveform 130 includes a set of "k+1" transmit bursts 132, with each transmit burst 132 having "i" transmit sub-pulses 134. In the illustrated embodiment, "i" and "k+1" are selected to be ten (10) and twenty-one (21), respectively. In the example shown, the waveform 130 is transmitted in a total time of 6.3 ms with a PRF of 3.33 kHz.

A group of sub-pulses, denoted generally by sub-pulse group "j", are used for each of the beams 1C through 5C. In the illustrated embodiment, there are two (2) sub-pulses in a group j. The sub-pulse pairs for beam 1C, beam 2C, beam 3C, beam 4C and beam 5C are indicated by reference numerals 136 (j=1), 138 (j=2), 140 (j=3), 142 (j=4) and 144 (j=5), respectively. In the example shown, each sub-pulse duration 146 is 3.85 μs, and the inter-sub-pulse spacing 148 is 2.15 μs. Sub-pulses 1 and 2 in pair 136 are used for transmission into beam 1C, which is a focused beam. Sub-pulses 3 and 4 in pair 138 are used for transmission into beam 2C, which is a defocused beam in elevation. Sub-pulses 5 and 6 in pair 140 are used for transmission into beam 3C, which has a greater defocusing in elevation. Sub-pulses 7 and 8 in pair 142 are used for beam 4C, which has an even further defocusing in elevation. Finally, sub-pulses 9 and 10 in pair 144 are used for transmitting into beam 5C, which has a still further defocusing in elevation. In the illustrated embodiment, beams 2C, 3C, 4C, and 5C are defocused in elevation by spoiling factors of 1.25, 2.0, 4.0 and 6.5, respectively. It is possible to increase the defocusing with increasing elevation of the beam because the targets are at closer range for the higher elevation beams. The ith sub-pulse (where i=1 through 10) for of each group k has the same carrier frequency. Moreover, the 21 sub-pulses i for i=1 form a coherent pulse Doppler waveform (burst) of duration 6.3 ms, which typically is the dwell time on target. The same is true for i=2, 3, etc. The frequency for sub-pulses in each pair j, for example, sub-pulse 1 and sub-pulse 2 of pair j=1, differ, however. This is done to provide frequency diversity for more efficient target detection. The spoiling of the beams is chosen so as to provide the needed coverage in elevation, while at the same time maintaining a high enough signal-to-noise (SNR) ratio from each coherent burst (in this case, consisting of 21 sub-pulses) for target detection and angle estimation, of like greater than 11 dB, after pulse compression and coherent pulse Doppler processing of each of the 21 sub-pulse bursts that form the time-multiplexed pulse Doppler burst waveforms.

Because the range of the target is known, it is also known when the echo from each of the sub-pulses will be returned. For example, it is known when the echo for sub-pulse 1 will be returned. In addition, the elevation angle at which the echo is expected is also known, it having been transmitted using beam 1C so it can be expected to come back at the same angle as beam 1C. Hence when the echo is expected, a receive beam having the same elevation angle as that used on transmit for beam 1C (which in this case is a focused beam) is formed. This beam will have, in addition to a sum beam channel, a delta AZ and delta EL channel (these channels being assumed available). Consequently, it is possible to process the echo from the sub-pulse 1. The echo from sub-pulse 2 will arrive at a known time after sub-pulse 1, this time being 6 μs in the illustrated waveform. It will also arrive in receive beam 1C because transmit beam 1C was used to transmit it. Most importantly, the echo from sub-pulse 2 doesn't overlap the echo from sub-pulse 1. Thus, it is possible to timeshare the same three receivers for sub-pulses 1 and 2, which have different carrier frequencies. As already indicated different carrier frequencies are used for sub-pulses 1 and 2 in order to make the target fluctuate from sub-pulse to sub-pulse to enhance target detectability. The sub-pulses in different beams have different frequencies to eliminate the possibility of interference of the echoes from the different beams 1C to 5C.

Figure 6:
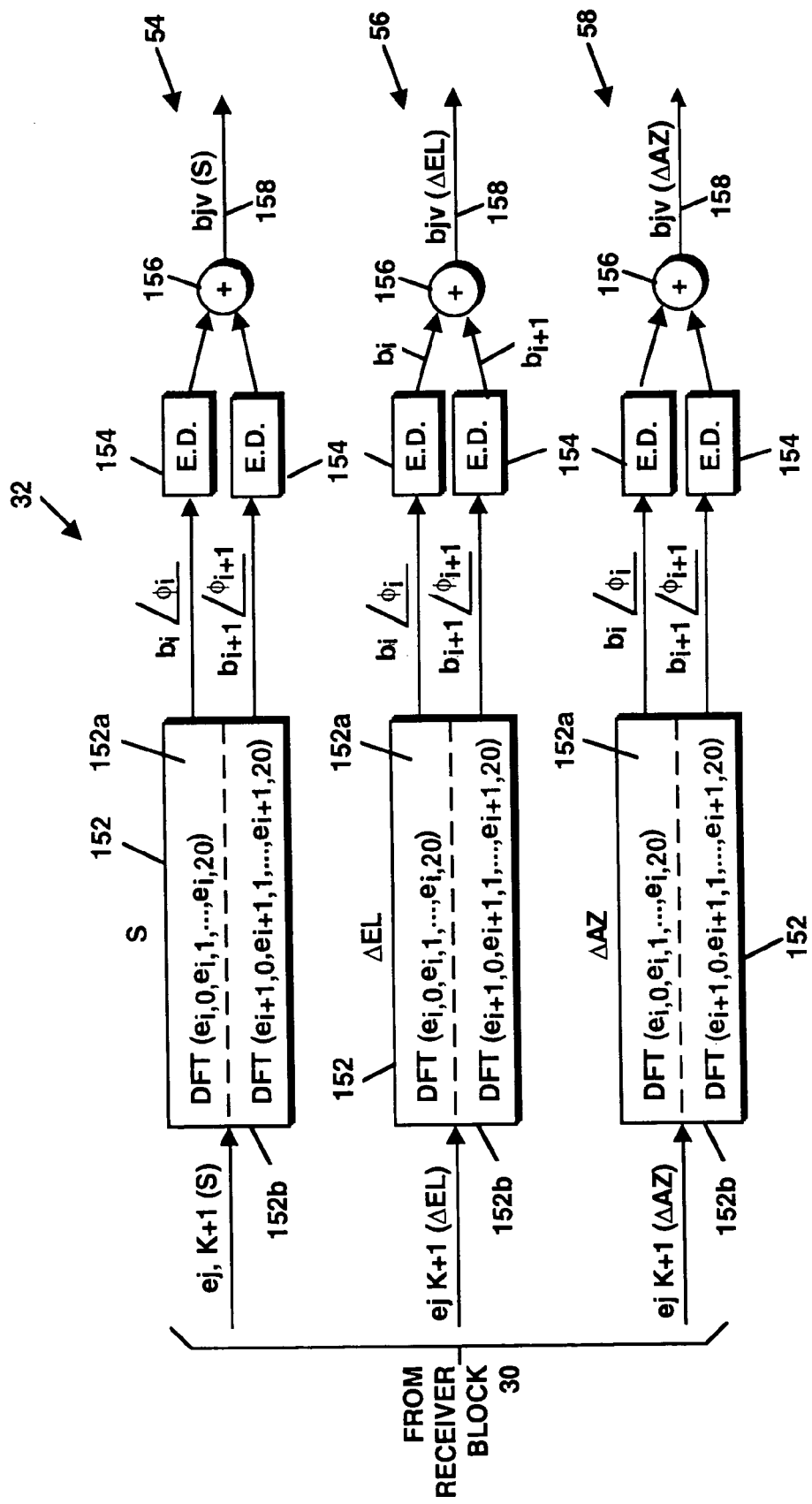
FIG. 6 is a detailed block diagram of the detector block of FIG. 1.

Referring to FIG. 6, an exemplary implementation of the detector block 32, which includes sum detector 54, elevation difference detector 56 and azimuth difference detector 58, as discussed above, is shown. Each of the three channels includes digitized samples of the compressed echo signal sub-pulses (indicated, for each pair j, as "$e_{j,k+1}$") received from the receiver block 30. The k+1 digital samples of a given sub-pulse i of a specific sub-pulse pair j for a given range (that is, $e_{i,0}$, $e_{i,1}$, . . . , $e_{i,20}$) are transformed by a Discrete Fourier Transform (DFT) 152 to produce amplitude and phase values amplitude $b_i$ and phase $\delta_i$ for several Doppler cells. Similarly the k+1 sub-pulses i+1 of the same sub-pulse pair j (that is, $e_{i+1,0}$, $e_{i+1,1}$, . . . , $e_{i+1,20}$) are processed to produce the amplitude and phase $b_{i+1}$ and $\delta_{i+1}$ for several Doppler cells and for range cells covering the uncertainty in our knowledge of the target location. These two DFT's are processed by separate DFTs, for example DFT 152a for the k+1 i sub-pulses and DFT 152b for the k+1 i+1 sub-pulses in the pair j, as shown. Alternately, the sub-pulses in the pair can be processed in a time-sharing manner by a single DFT. The magnitudes of each of the values is selected by a corresponding envelope detector 154, and the magnitudes $b_i$ and $b_{i+1}$ for the sub-pulses in the pair are combined by a summer 156 to produce a single detector output value (magnitude) $b_{jv}$ 158 for the jth pair. For simplicity, only envelope detector and summer functionality for a single sub-pulse pair in each of the different channels is shown. This calculation of $b_{jv}$ is performed for the several range cells covering the uncertainty in our knowledge of the target.

Thus, for the first transmit beam 1C, the sum detector's DFT 152a handles sub-pulses i=1 (with frequency F1) and DFT 152b handles sub-pulses 2 (with frequency F2). The DFT 152a produces, from the k+1 sub-pulses where k=0, 1, 2, . . . , 20, for example, $b_1$. The DFT 152b does likewise for sub-pulse 2 to produce $b_2$. These are then added to form $b_{1v}$. This is calculated for several range cells as indicated above. For each range cell one obtains $b_1$'s and $b_2$'s for several Doppler cells.

This processing is performed in each of the sum, elevation difference and azimuth difference detectors, as shown in the figure. The outputs of the detector block 32 are used to detect (via the threshold detect unit 60) the target and, in turn, using the monopulse processing unit 34, to estimate the target's elevation and azimuth angles. If, for example, the threshold detect unit 60 detects the target for sum detector output value $b_{1v}$ (S) (that is, for j=1), the monopulse processing unit 34 will take the corresponding elevation difference detector output $b_{1v}(\Delta EL)$ and uses the ratio $b_{1v} (\Delta EL)/b_{1v}$ (S) to determine an estimate of the elevation angle, $\theta_{EL}$. The azimuth angle can be produced in the same manner.

In the example above, the target is detected in beam 1C (j=1). If the target is not detected in the echoes from beam 1C, echoes from beams 2C, 3C, 4C and 5C are examined in turn to determine if the target is present in those beams. Like the echoes from sub-pulses 1 and 2, the echoes from sub-pulses in the sub-pulse pairs for the other beams, e.g., sub-pulses 3 and 4 of beam 2C, do not overlap each other or echoes from any of the other sub-pulses. The burst of sub-pulses in each consecutive sub-pulse pair are processed using the same channels that were used for sub-pulses 1 and 2 of beam 1C. For beams 2C, 3C, 4C and 5C, the receive beams are spoiled by the same amount in elevation on receive as they were spoiled on transmit. If the target is detected in beam 1C, because it is a focused beam an accurate AZ and EL angle estimate is obtained. If the target is detected in beam 2C through 5C, the estimate of the target's elevation and azimuth angles are not as accurate as would be obtained with a focused beam. As a result, if the target is detected in one of these defocused beams, and as indicated above with reference to step 128, a focused beam is transmitted in the direction of the target (based in the initial estimate) using a simple pulse Doppler waveform (or time-multiplexed pulse Doppler waveform in order to obtain a track update on other targets at the same time for the case where other targets exist, as will be discussed shortly). This focused beam on receive has a ΔAZ and ΔEL channel for estimating the target AZ and EL angles. The echo from this focused beam observation is very accurate as the beam is focused and monopulse channels are being used.

For the angle estimates expected with the defocused beams, the first estimate is like 0.20 degrees to 0.48 degrees followed by the second estimate with the focused beam of 0.17 degrees. After the video integration, the SNR ratio in all cases for the defocused beam is typically greater than or equal to 11 dB. For the focused beam, the SNR is even better than for the defocused beam.

Figure 7:
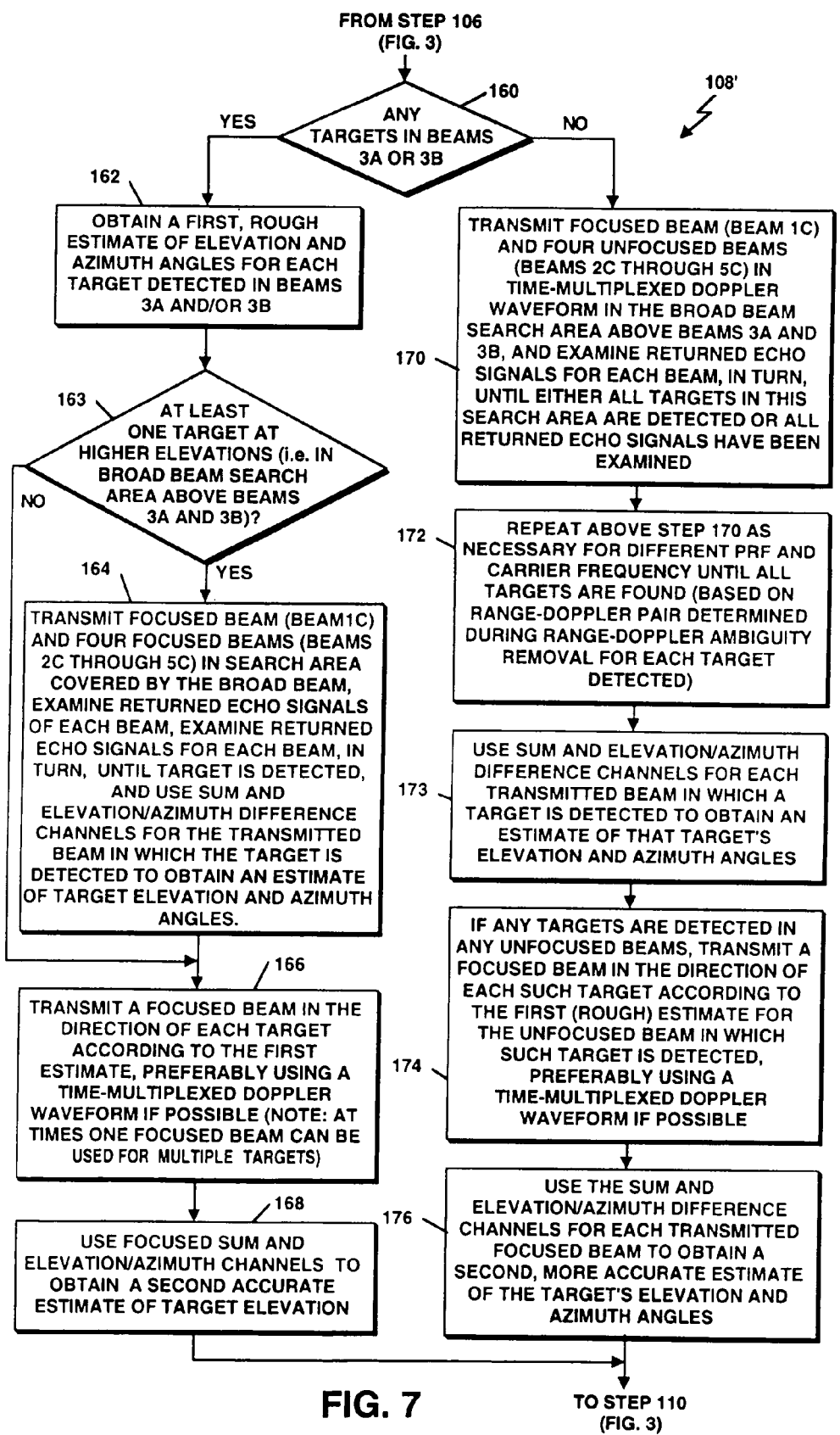
FIG. 7 is a flow diagram of the elevation angle determination process for multiple detected targets.

FIG. 7 shows an embodiment of elevation angle determination process 108 (from FIG. 4), indicated as elevation angle determination process 108', which assumes that multiple targets are detected. First, the process 108' determines if the targets are detected in beams 3A/3B (lower elevation search area) (step 160). If so, the process 108' obtains a first rough estimate of the elevation and azimuth angles for the lower elevation target detected in beam 3A and/or 3B (step 162). The process 108' determines if at least one target is detected in the broad beam search area above beams 3A and 3B (step 163). If detection of such higher elevation target occurred, the process 108' performs step 126 (from FIG. 4) for the target detected at the higher elevation (step 164). If a target is detected in any of the unfocused beams, the process 108' transmits a focused beam in the direction of that target as well as the target detected in beams 3A or 3B according to the respective first (rough) estimates of each target's elevation and azimuth angles (step 166). Preferably, if possible, a time-multiplexed pulse Doppler waveform like the one used for the five consecutive beams (shown in FIG. 5) may be used to transmit the focused beams. In this instance, however, j is equal to the number of targets instead of five. The use of the time-multiplexed pulse Doppler beam in this instance assumes that the chosen PRF and carrier frequency do not result in any range eclipsing (overlapping transmit and echo pulses) or Doppler blindness (that occurs when the PRF line up with the target Doppler). After the focused beams are transmitted, the sum and elevation/azimuth difference channels for each transmitted focused beam are used to obtain a second, more accurate estimate of the target elevation and azimuth angles (step 168.)

Otherwise, if all targets are in the search area above beams 3A and 3B, the process 108' transmits a focused beam (beam 1C) and the four unfocused beams in the broad search area above beams 3A/3B, and examines the returned echoes for each beam, in turn, until either all targets are detected or returned echo signals have been examined (step 170). This step may be repeated using a different PRF and frequency for the set of five beams, if necessary, to find all of the targets (step 172). The process 108' uses the sum elevation/azimuth difference channels for each transmitted beam in which a target is detected to obtain an estimate of that target's elevation and azimuth angles (step 173). If any targets are detected in any of the unfocused beams, the process 108' transmits a focused beam in the direction of each such target according to the first (rough) estimate of that target's elevation and azimuth angles (step 174). If possible, when more than one focused beam is required, a time-multiplexed pulse Doppler waveform may be used to transmit the focused beams. Again, j is equal to the number of targets (in the present example, j=2). Also, as was mentioned earlier with respect to step 166, the use of the time-multiplexed pulse Doppler beam assumes that the chosen PRF and carrier frequency yield no range eclipsing or Doppler blindness. After the focused beams are transmitted, the sum and elevation/azimuth difference channels for each transmitted focused beam are used to obtain a second, more accurate estimate of the target elevation and azimuth angles (step 176.)

Other embodiments are within the scope of the following claims. For example, it will be understood that the search process 100 need not make use of receive beams 3A and 3B. Without the examination of these beams, it will be appreciated that the process 108 becomes the same as process 124, but with possibly a greater number of transmit beams involved, for example, 7 beams instead of 5, starting from the same elevation angle as the broad beam (5.6 degrees in the example illustrated in FIG. 2). Also, the number of focused and unfocused beams that are used may vary. It will be further understood that such parameters as PRF, beam spoiler factor and beamwidth can be adjusted as well to achieve optimal performance for a given system design. In addition, while the described embodiment includes an azimuth difference channel for determining azimuth angle, it will be appreciated that elevation angle determination requires, at the minimum, a sum and an elevation difference channel. That is, an azimuth difference channel may not be needed. The azimuth of the target in this case can be obtained from the change in amplitude of the burst waveform with scan angle across the target. As most monopulse designs have both difference channels, the azimuth angle would of course be determined as well. Also, it is not necessary that a pulse Doppler waveform be used. Instead, a single transmit burst or pulsed signal (k+1=1, that is, k=0) can be used.

What is claimed is:

1. A method for determining target elevation during a radar search comprising:
    determining the range of any target detected during a search with a broad beam covering a broad angular search area;
    based on the determined range, transmitting consecutive beams at increasing search elevation angles in the broad angular search area; and
    using echo signals of the consecutive beams to determine an elevation angle estimate for the target.

2. The method of claim 1 wherein the broad beam comprises a shaped cosecant-squared beam.

3. The method of claim 1 wherein one of the consecutive beams is a focused beam.

4. The method of claim 1 wherein all but a first one of the consecutive beams are defocused beams.

5. The method of claim 4 wherein the defocused ones of the consecutive beams are defocused by spoiling factors that increase with the increasing elevation search angles.

6. The method of claim 1 wherein transmitting comprises:
    transmitting a time-multiplexed pulse Doppler waveform which includes a set of transmit bursts, each transmit burst including a number of sub-pulses.

7. The method of claim 6 wherein consecutive groups of sub-pulses in each transmit burst correspond to the consecutive beams.

8. The method of claim 7 wherein corresponding ones of the sub-pulses in each of the transmit bursts of the set have the same carrier frequency and are coherent with each other.

9. The method of claim 8 wherein the different sub-pulses of each transmit burst have different carrier frequencies.

10. The method of claim 8 wherein the sub-pulses of each group of each transmit burst have different frequencies and corresponding ones of the sub-pulses in different groups for different beams can have the same carrier frequency.

11. The method of claim 9 wherein all but a first one of the consecutive beams are defocused.

12. The method of claim 9 wherein all of the consecutive beams are defocused beams.

13. The method of claim 4 wherein using echo signals comprises:
    processing echo signals of the first one of the consecutive beams to detect the target; and
    if the target is detected, using results of the processing to determine an elevation angle estimate for the target.

14. The method of claim 13 wherein using echo signals further comprises:
    processing, in turn, echo signals of the defocused consecutive beams in sum and difference channels until the target is detected in one of the defocused consecutive beams;
    using the results of the processing of the echo signals of the one of the defocused consecutive beams in which the target is detected to provide a first estimate of the elevation angle of the target;
    transmitting a focused beam towards the target based on the first estimate; and
    processing echo signals of the focused beam in the sum and difference channels to detect the target and determine a second, more accurate estimate of the elevation angle of the target.

15. The method of claim 14 further comprising:
    using receive beams received by available elevation and azimuth difference channels for a lower elevation search area covered by the broad beam at an elevation angle below that at which the consecutive beams are transmitted and prior to the transmission of the consecutive beams, to determine whether any targets are detected in the lower elevation search area; and
    if multiple targets are detected and at least one of the multiple targets is detected in the lower elevation search area as a lower elevation target, then performing the steps of: obtaining a rough elevation angle estimate for the lower elevation target; and
    transmitting a focused beam towards the lower elevation target based in the rough estimate.

16. The method of claim 15 wherein transmitting the focused beam towards the lower elevation target based on the rough estimate occurs in a single time-multiplexed pulse Doppler waveform.

17. The method of claim 15 further comprising:
if multiple targets are detected and all of the multiple targets are detected in the broad angular search area above the lower elevation search area, then performing the steps of:
processing, in turn, echo signals of the defocused consecutive beams in sum and difference channels until either all of the multiple targets are detected or all of the echo signals of the defocused consecutive beams have been processed;
if all of the multiple targets are not detected with one pulse repetition frequency (PRF), then repeating the steps of transmitting consecutive beams with a different PRF and processing the echo signals of each consecutive beam until all of the multiple targets are detected;
using the results of the processing steps to provide first estimates of the elevation angle of each target;
transmitting a focused beam towards each target based on the first estimate of such target; and
processing echo signals of the focused beams in the sum and difference channels to detect each target and determine a second, more accurate estimate of the elevation angle of each target.

18. The method of claim 17 wherein transmitting the focused beam towards each target occurs in a single time-multiplexed pulse Doppler waveform.

19. The method of claim 1 wherein transmitting comprises:
transmitting a time-multiplexed pulse Doppler waveform which includes a set of transmit bursts, each transmit burst including the same number of sub-pulses.

20. The method of claim 1 wherein transmitting comprises:
transmitting a waveform comprising a single transmit burst.

21. The method of claim 20 wherein consecutive groups of sub-pulses in the transmit burst correspond to the consecutive beams.

22. The method of claim 21 wherein corresponding ones of the sub-pulses in each of the transmit burst of the set have the same carrier frequency and are coherent with each other.

23. The method of claim 22 wherein the different sub-pulses of the transmit burst have different carrier frequencies.

24. The method of claim 22 wherein the sub-pulses of each group of the transmit burst have different frequencies and corresponding ones of the sub-pulses in different groups for different beams can have the same carrier frequency.

25. The method of claim 23 wherein all but a first one of the consecutive beams are defocused.

26. The method of claim 23 wherein all of the consecutive beams are defocused beams.

27. The method of claim 1 further comprising:
using one or more pencil beams to detect the target at elevation angles lower than those covered by the broad beam.

28. The method of claim 1 wherein transmitting comprises transmitting the consecutive beams sequentially in time.

29. A method for determining target location during a radar search comprising:
determining the range of any target detected during a search with a broad beam covering a broad angular search area;
based on the determined range, transmitting consecutive beams at increasing search elevation angles in the broad angular search area; and
using echo signals of the consecutive beams to determine at least one angle estimate for the target.

30. The method of claim 29 wherein the at least one angle estimate comprises an elevation angle estimate and an azimuth angle estimate.

31. A radar system comprising:
means for determining the range of any target detected during a search with a broad beam covering a broad angular search area;
means for transmitting consecutive beams at increasing search elevation angles in the broad angular search area for the determined range; and
means for using echo signals of the consecutive beams to determine an elevation angle estimate for the target.

32. A radar system comprising:
an antenna system;
a transmitter coupled to the antenna system;
a receiver coupled to the antenna system;
a controller to control the transmitter, receiver and antenna system;
wherein the receiver, responsive to control signals from the controller, operates to determine the range of any target detected during a search with a broad beam covering a broad angular search area;
wherein the transmitter, responsive to signals from the controller, operates to transmit, via the antenna system, consecutive beams at increasing search elevation angles in the broad angular search area for the determined range; and
wherein the receiver, responsive to control signals from the controller, operates to use echo signals of the consecutive beams received via the antenna system to determine an elevation angle estimate for the target.

33. The radar system of claim 32, wherein the broad beam comprises a shaped cosecant-squared beam.

34. The radar system of claim 32 wherein at least one of the consecutive beams is a focused beam.

35. The radar system of claim 32 wherein all but a first one of the consecutive beams are defocused beams.

36. The radar system of claim 32 wherein all of the consecutive beams are defocused beams.

37. The radar system of claim 35 wherein the defocused ones of the consecutive beams are defocused by spoiling factors that increase with each consecutive beam.

38. The radar system of claim 32 wherein the transmitted consecutive beams are transmitted in a single time multiplexed pulse Doppler waveform which includes a set of transmit bursts, each burst including a number of sub-pulses with each sub-pulse forming a pulse Doppler waveform.

39. The radar system of claim 36 wherein consecutive groups of sub-pulses in each transmit burst correspond to the consecutive multiple beams.

40. The radar system of claim 36 wherein a corresponding ones of the sub-pulses in each of the transmit bursts of the set have the same carrier frequency and are coherent with each other.

41. The radar system of claim 38 wherein the sub-pulses of each transmit burst have different carrier frequencies.

42. The radar system of claim 41 wherein the sub-pulses of each group of each transmit burst have different frequencies and corresponding ones of the sub-pulses in different groups for different beams can have the same carrier frequency.

43. The radar system of claim 41 wherein all but a first one of the consecutive beams are defocused.

44. The radar system of claim 41 wherein all of the consecutive beams are defocused beams.

45. The radar system of claim 32 wherein the echo signals are used to process echo signals of the first one of the consecutive beams to detect the target and, if the target is detected, determine from the results of the processing an elevation angle estimate for the target.

46. The radar system of claim 45 wherein the echo signals are used to process, in turn, echo signals of the defocused consecutive beams in sum and difference channels until the target is detected in one of the defocused consecutive beams, obtain from the results of the processing of the echo signals of the one of the defocused consecutive beams in which the target is detected a first estimate of the elevation angle of the target, transmit a focused beam towards the target based on the first estimate and process echo signals of the focused beam in the sum and difference channels to detect the target and determine a second, more accurate estimate of the elevation angle of the target.

47. The radar system of claim 32 wherein the focused beam is transmitted as a time-multiplexed pulse Doppler waveform which includes a set of transmit bursts, each transmit burst including the same number of sub-pulses.

48. The radar system of claim 32 wherein the focused beam is transmitted as a pulsed signal comprising a single transmit burst.

49. The radar system of claim 48 wherein consecutive groups of sub-pulses in the transmit burst correspond to the consecutive beams.

50. The radar system of claim 49 wherein corresponding ones of the sub-pulses in each of the transmit burst of the set have the same carrier frequency and are coherent with each other.

51. The radar system of claim 50 wherein the different sub-pulses of the transmit burst have different carrier frequencies.

52. The radar system of claim 50 wherein the sub-pulses of each group of the transmit burst have different frequencies and corresponding ones of the sub-pulses in different groups for different beams can have the same carrier frequency.

53. The radar system of claim 51 wherein all but a first one of the consecutive beams are defocused.

54. The radar system of claim 51 wherein all of the consecutive beams are defocused beams.

55. The radar system of claim 32 wherein one or more pencil beams are used to detect the target at elevation angles lower than those covered by the broad beam.

56. A radar system for determining target location during a radar search comprising:
   means for determining the range of any target detected during a search with a broad beam covering a broad angular search area;
   means for transmitting consecutive beams at increasing search elevation angles in the broad angular search area based on the determined range; and
   means for using echo signals of the consecutive beams to determine at least one angle estimate for the target.

57. The radar system of claim 56 wherein the at least one angle estimate comprises an elevation angle estimate and an azimuth angle estimate.

* * * * *

UNITED STATES PATENT AND TRADEMARK OFFICE
CERTIFICATE OF CORRECTION

PATENT NO.       : 7,038,615 B2                                   Page 1 of 1
APPLICATION NO.  : 10/683507
DATED            : May 2, 2006
INVENTOR(S)      : Brookner It is certified that error appears in the above-identified patent and that said Letters Patent is hereby corrected as shown below:

Column 7, line 2 delete "6 ‖s" and replace with --6 µs--.

Column 7, line 30 delete "two DFT's" and replace with --two DFTs--.

Column 8, line 41 delete "beam 3A and/or 3B" and replace with --beams 3A and /or 3B--.

Column 11, line 12 delete "(PRE)" and replace with --(PRF)--.

Column 12, line 53 delete "40. The radar system of claim 36 wherein a corresponding ones" and replace with --40. The system of claim 38 where corresponding ones--.

Signed and Sealed this

Twentieth Day of May, 2008

JON W. DUDAS
*Director of the United States Patent and Trademark Office*